March 28, 1950

W. A. DAVIDSON 2,502,372

ELECTRIC SEWING MACHINE CABINET WITH BUILT-IN MOTOR CONTROLLER

Filed Nov. 5, 1947

Inventor
William A. Davidson
By
William P. Stewart
Attorney

Witness:
William Martin

Patented Mar. 28, 1950

2,502,372

UNITED STATES PATENT OFFICE 2,502,372

ELECTRIC SEWING-MACHINE CABINET WITH BUILT-IN MOTOR CONTROLLER

William A. Davidson, Elizabeth, N. J., assignor to The Singer Manufacturing Company, Elizabeth, N. J., a corporation of New Jersey Application November 5, 1947, Serial No. 784,134

6 Claims. (Cl. 201—51)

This invention relates to cabinets for electric motor driven sewing machines and has for an object to provide a sewing machine cabinet with a motor controller located within its base and an actuator for the controller which is movable into the base when the cabinet is not used for sewing and is readily releasable for outward movement when the operation of the sewing machine is desired.

Another object of this invention is to provide an electric sewing machine cabinet which has the general appearance of a desk and to provide a simple and effective actuator for the motor controller which is latched within the general contour of the cabinet when not in use and is releasable under spring action by a slight pressure of the operator's toe.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the accompanying drawings—

Figure 2:
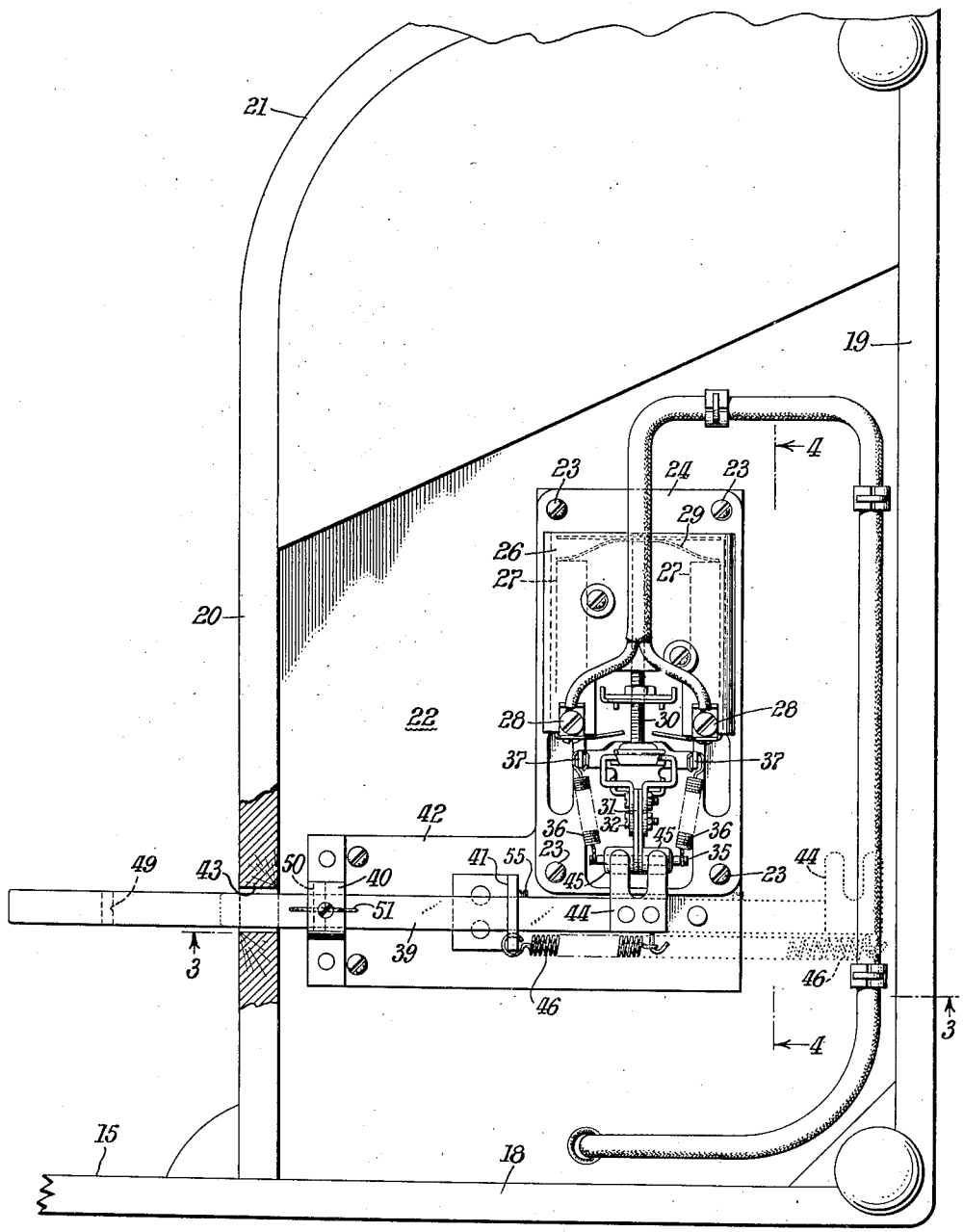
Fig. 2 is a bottom plan view of the motor controller and actuating mechanism shown in Fig. 1.
Figure 3:
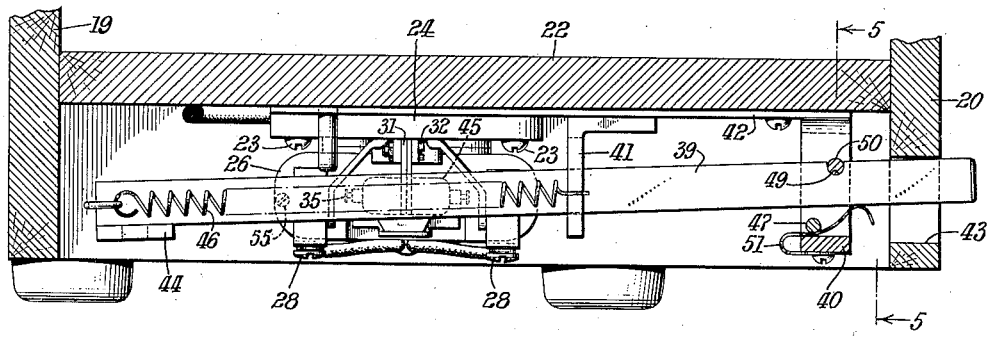
Figure 4:
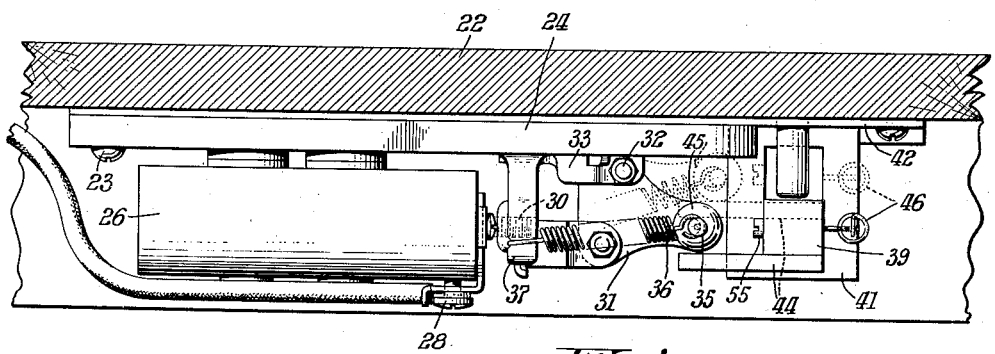

Figs. 3 and 4 are vertical sectional views taken along the lines 3—3 and 4—4, respectively, of Fig. 2.

Figure 5:
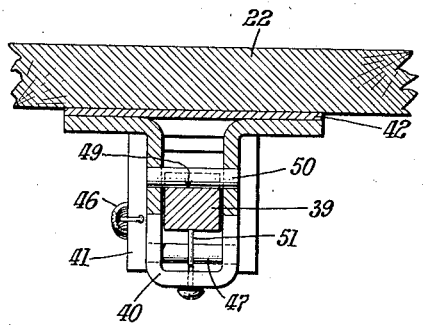

Fig. 5 is an enlarged fragmentary view taken along the line 5—5 of Fig. 3.

Figure 1:
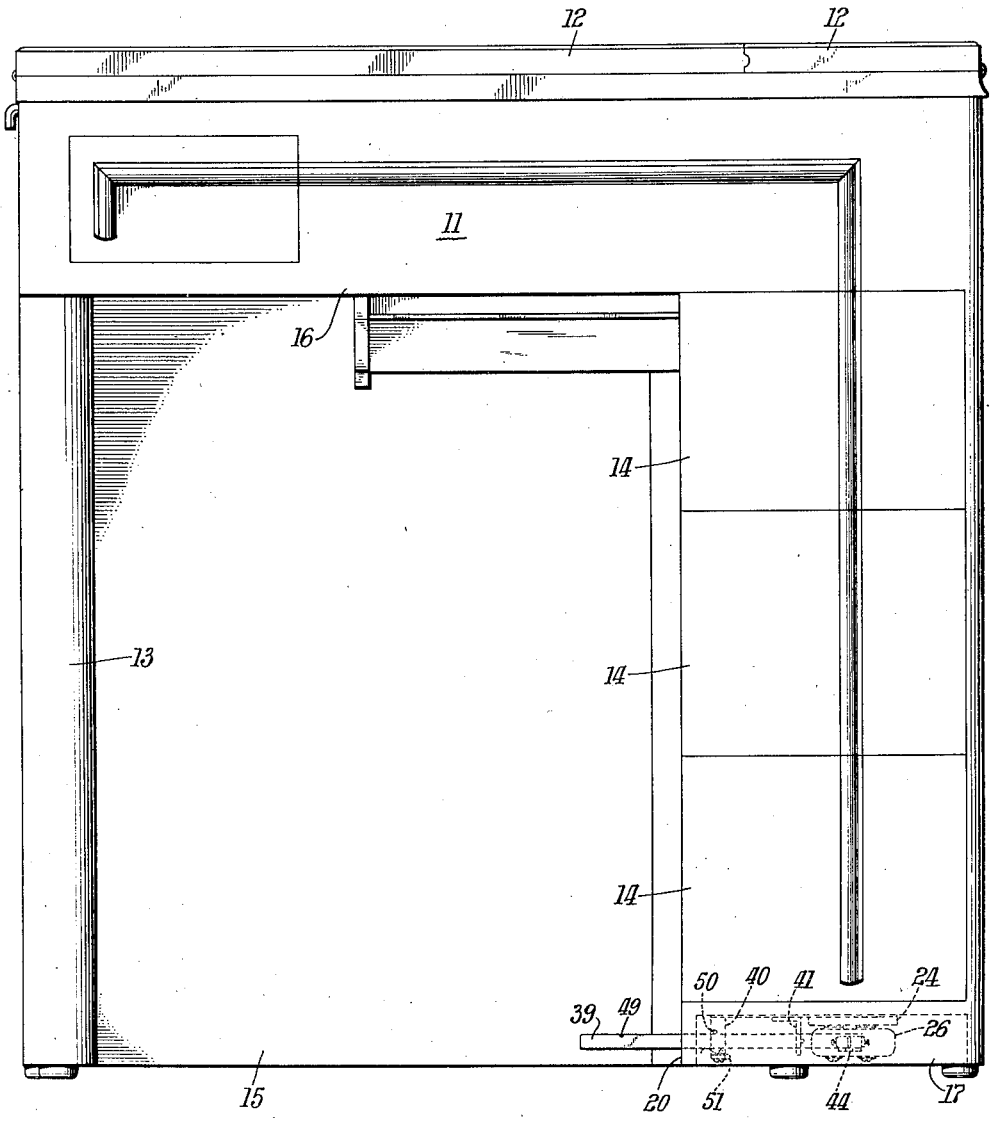
Figure 1 is a front elevation of a desk type electric sewing machine cabinet having my improved motor controller and its actuating mechanism embodied therein.

In the embodiment of my invention selected for illustration, my improved motor controller together with its actuating means is shown embodied in a sewing machine cabinet of the drop head type. The cabinet has the general appearance of a writing desk and is adapted to be used as such as well as a sewing machine cabinet. Referring to Fig. 1, the numeral 11 represents a cabinet having hinged cover leaves 12, a leg 13 and a column of drawers 14. The cabinet includes a rear wall 15 which extends from the top to the base of the cabinet and a relatively narrow front wall 16; the space between such walls constituting a cavity below the table top into which the sewing machine is lowered when it is not in use and the cabinet is to be used as a writing desk.

The sewing machine is driven by an electric motor of the type shown in the Peets Patent No. 1,934,373, dated Nov. 7, 1933. The motor controller is mounted in a hollow base portion 17 located below the column of drawers 14.

The base portion 17 has a depending end wall 18 and depending side-walls 19 and 20 (Fig. 2), the side-wall 20 being curved at 21 so as to meet the straight side-wall 19. The walls 19 and 20 together with the end wall 18 form an enclosure in which the motor controller and its actuating mechanism are located.

To the under side of a flat horizontal support 22, located beneath the lower drawer 14, there is secured by the screws 23 a base plate 24 which carries a rheostat of the well known compression type. Such a rheostat commonly comprises a porcelain body 26 provided with a pair of stacks 27 of disks of carbon, graphite or the like. The stacks 27 are each connected at one end to a terminal screw 28 and at its opposite end to a conducting pressure head 29 operated by a pull-rod 30 which is operatively connected to a triangularly shaped lever 31 fulcrumed at 32 on ears 33 carried by the base plate 24. The lever 31 carries a cross-bar 35, to the ends of which are connected the tensioned recovery springs 36, anchored to the notched horns 37, depending from the plate 24 at opposite sides of the pull-rod 30.

From the above it will be observed that when pressure is applied to the cross-rod 35 so as to move it from the full line to the dotted line position shown in Fig. 4 the lever 31 will move about its fulcrum 32 and cause the pull-rod 30 to move the pressure head 29 towards the carbon piles 27 to compress the piles and thus vary the resistance thereof. The springs 36 act to maintain the pull-rod 30 and pressure-head 29 in a position in which no pressure is applied to the piles. For a more detailed description of the above described rheostat, reference may be had to the Schenk Patent No. 2,117 257, dated May 10, 1938.

In order to shift the lever 31 about its fulcrum 32, I have provided a rod 39 which is slidable endwise in guides 40 and 41 fixed to a plate 42 secured to the under side of the support 22. One end of the rod extends through an aperture 43 in the side-wall 20 to a position outside of the hollow base so that it may be engaged by the foot of the operator and its other end is provided with a bifurcated arm 44, the free ends of which underlie the rollers 45 carried by the cross-bar 35 when the rod 39 is in its operative position.

The rod 39 is constantly urged outwardly through the aperture 43 to its operative position, as shown in full lines in Fig. 2, by a tension spring 46 which has one of its ends secured to the bar 39 and its other end anchored in the guide 41. As shown in Fig. 3, the rod 39 overlies a pivot pin 47 which is carried by the guide 40 and is arranged transversely of the length of the rod. The pin 47 forms a fulcrum point about which the rod 39 pivots when it is in its operative position.

In order to latch the rod 39 in its retracted or inoperative position, shown in full lines in Fig. 3, the upper part of the rod is formed with a semicircular notch 49 which is adapted to be entered by a transversely arranged pin 50 carried by the guide 40. A small wire spring 51 has one of its ends secured to the lower part of the guide 40 and its free end in engagement with the lower surface of the rod. This spring is strong enough to overcome the weight of the rod 39 and maintain it in the position shown in Fig. 3.

In the operation of my improved motor controller when the parts are in the position shown in Fig. 3 and it is desired to use the controller for the sewing machine motor, a slight pressure of the operator's toe is applied to the protruding free end of the rod 39 thereby unlatching the rod and permitting the spring 46 to move the rod outwardly through the opening 43 in the base of the cabinet until the stop screw 55 engages the guide 41. The rod 39 is then in its operation position as shown in full lines in Fig. 2. In this position the ends of the bifurcated arm 44 underlies the rollers 45 and when the free end of the rod 39 is depressed by the operator the rod 39 pivots about the pin 47 and the arm 44 presses upon the rollers 45 and moves the pivoted lever 31 and pull-rod 30 thereby varying the position of the pressure head 29 and the pressure upon the carbon piles 27. When it is no longer desired to operate the sewing machine the rod 39 is pushed inwardly into the hollow base by the operator's foot until the notch 49 is entered by the pin 50 thereby latching the rod in its inoperative position.

Having thus set forth the nature of the invention, what I claim herein is:

1. A sewing machine motor controller adapted to be mounted within the confines of a sewing machine cabinet, comprising, a carbon pile resistor of the compression type carried by said cabinet, a pivoted operating lever for varying the pressure on said carbon piles, a second pivoted lever mounted in said cabinet for endwise movement from an operative to an inoperative position, said second lever having operative connections with said first lever when said second lever is in its operative position, a spring constantly urging said second lever towards its operative position, and a latch for releasably holding said second lever in its inoperative position.

2. In a sewing machine cabinet having a hollow base portion with depending side-walls, an electric motor controller mounted in said hollow base portion, an elongated foot operated member for actuating said controller and mounted for longitudinal movement in said base, a spring for urging said member outwardly from beneath said base through one of said walls to an extended position where it may be engaged by the foot of the operator, means for pivotally supporting said member for swinging movement in a vertical plane for actuation of said controller when said member is in its extended position, spring means for opposing the swinging movement of said member, and a latch mechanism for releasably holding said member within said base when the operation of the motor controller is not desired.

3. A sewing machine motor controller adapted to be mounted in the base of a sewing cabinet comprising, a bracket, a rheostat carried by said bracket and having a pivoted lever for actuating said rheostat, a foot actuated member mounted for longitudinal sliding movement from an operative to an inoperative position and relative to said pivoted lever, said member having a portion which underlies said lever when said member is in its operative position, a spring constantly urging said member longitudinally of itself to its operative position, and latch mechanism for holding said member in its inoperative position.

4. In combination with a sewing machine cabinet having a hollow base provided with an opening, a sewing machine motor controller of the resistance type mounted within said hollow base and having means including a pivoted lever for varying the resistance of said controller, a bracket located in said base carrying a guide, a controller actuating rod extending through said guide and said opening in said base and shiftable from operative to inoperative positions, a member operably connecting said rod with said pivoted lever when said rod is in its operative position, spring means for urging said rod outwardly through said opening in said base to its operative position, and a latch for holding said rod in its inoperative position, said latch being releasable when pressure is applied to said rod.

5. In combination with a sewing machine cabinet having a hollow base provided with an opening, an L-shaped plate mounted in said base, a sewing machine motor controller of the resistance type mounted on one leg of said plate and having means including a pivoted lever for varying the resistance of said controller, guide members carried by the other leg of said plate, an actuating rod slidably mounted in said guide members and having an end extending through said opening in said base, said rod being slidable in said guide from operative to inoperative position, a member of said rod for engagement with said lever when said rod is in its operative position, a spring for constantly urging said rod into its operative position, and automatically effective latch means for holding said rod within the base when said rod is shifted endwise into its inoperative position.

6. In combination with a sewing machine cabinet having a hollow base portion with a foot operated rheostat mounted in said hollow base, a pivoted lever associated with said rheostat for varying the electrical resistance of said rheostat when said lever is actuated, spring means for resisting the movement of said lever and maintaining said rheostat in its off position, a foot actuatable rod extending through an opening in one of the walls of said base and mounted for swinging movement in a vertical plane, spring means connected to said rod for urging said rod through said opening to an operative position, latch means for holding said rod in its inoperative position within the base, and means connecting said rod with said pivoted lever when said rod is manually operated whereby the electrical resistance of said rheostat may be varied by the vertical movement of said rod.

WILLIAM A. DAVIDSON.

REFERENCES CITED

The following references are of record in the file of this patent:

UNITED STATES PATENTS

| Number | Name | Date |
|---|---|---|
| 1,036,342 | Rogers | Aug. 20, 1912 |
| 1,441,422 | Hillix | Jan. 9, 1923 |
| 1,473,212 | Davis | Nov. 6, 1923 |
| 1,792,818 | Chason | Feb. 17, 1931 |
| 2,117,257 | Schenk | May 10, 1938 |
| 2,306,152 | Batcheller | Dec. 22, 1942 |